Oct. 7, 1941.   C. R. MORSE   2,257,807
SPRAYER
Filed Feb. 28, 1941   2 Sheets-Sheet 1

INVENTOR.
Charles R. Morse
BY Walter M. Fuller
atty

Oct. 7, 1941.  C. R. MORSE  2,257,807
SPRAYER
Filed Feb. 28, 1941  2 Sheets-Sheet 2
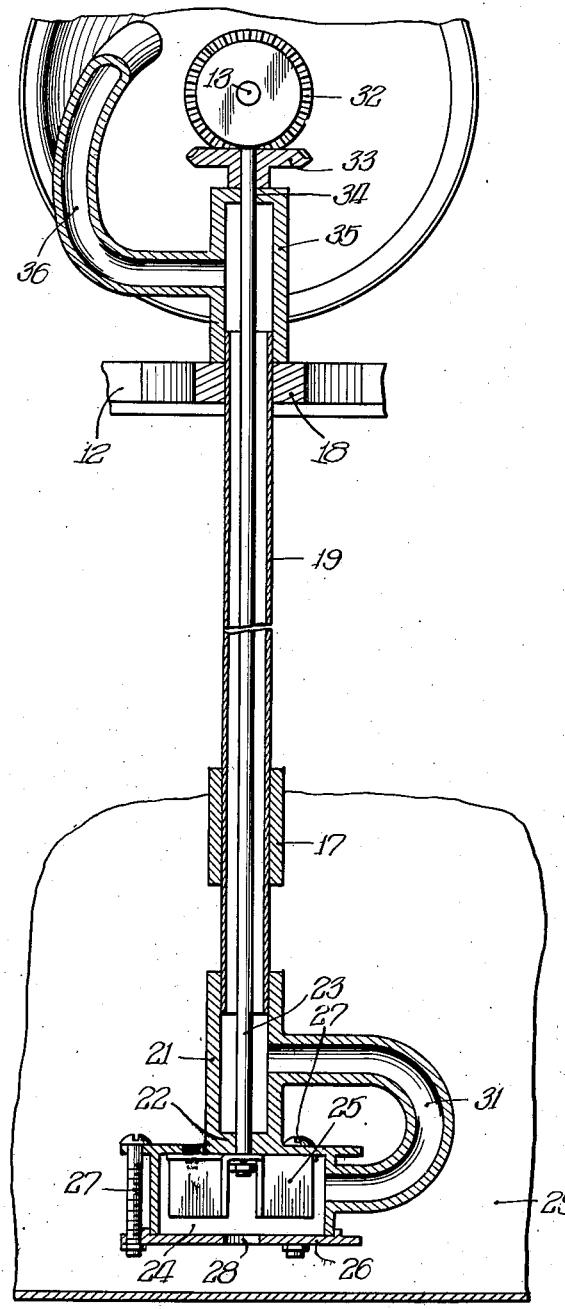
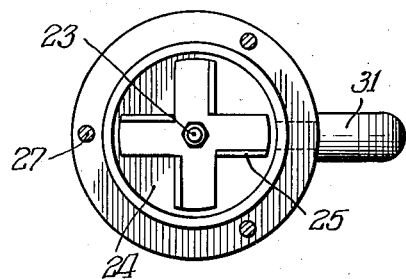
INVENTOR.
Charles R. Morse
BY Walter M. Fuller atty.

Patented Oct. 7, 1941

2,257,807

UNITED STATES PATENT OFFICE 2,257,807

SPRAYER

Charles R. Morse, Topeka, Kans.

Application February 28, 1941, Serial No. 381,051

2 Claims. (Cl. 299—63)

The present invention pertains or relates to appliances or devices for spraying or atomizing liquids, such as water, to cool, condition, or in some cases, to humidify, air to render its state more comfortable for those in contact therewith.

More specifically the novel apparatus is especially useful in projecting the moisture in the form of a cloud or mist on to the surface of an air-filter mat to cool the air drawn or forced through the filter by a suitable fan, whereby the air is adequately reduced in temperature to render it pleasant to the occupants of the space, as a room or rooms, supplied therewith.

Actual practice has demonstrated that where a reduction of the temperature only of the treated air is desired, this may be obtained without entraining added moisture in the conditioned air, even though the sprayed or vaporized water is used to effect the cooling result.

Outstanding objects and aims of the instant invention may be stated as the provision of an apparatus of the type or character referred to which is relatively simple in structure, which is efficient in operation, which is effective in results produced, which can be economically manufactured at comparatively small cost, and which is unlikely to become damaged or injured in ordinary service.

To enable those acquainted with this art to fully understand the several aspects of the invention and its various benefits accruing, a present preferred embodiment thereof has been fully illustrated in the accompanying drawings forming a part of this specification and to which reference should be had in connection with the following detailed description, and, for simplicity, in these drawings, like reference numerals have been employed to designate the same structural parts throughout the several views.

In these drawings:

Figure 3 is a vertical or longitudinal section through the apparatus on line 3—3 of Figure 2; and Figure 4 is a bottom plan view of the pump with its lower cover removed.

Figure 1:
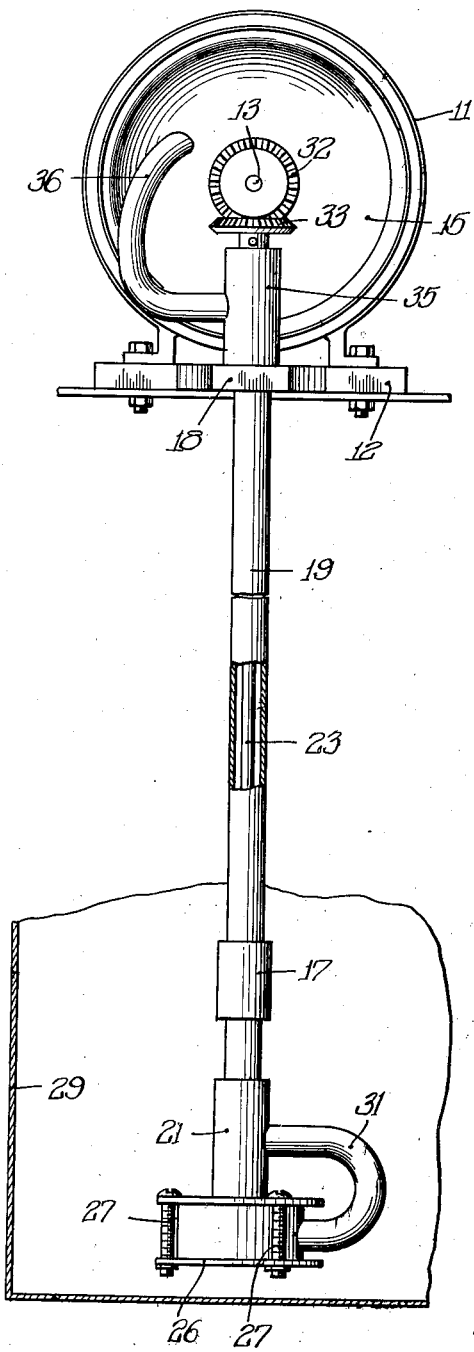
Figure 1 is an elevation of the new appliance, with a small part broken away to disclose a minor portion of the interior of the device.
Figure 2:
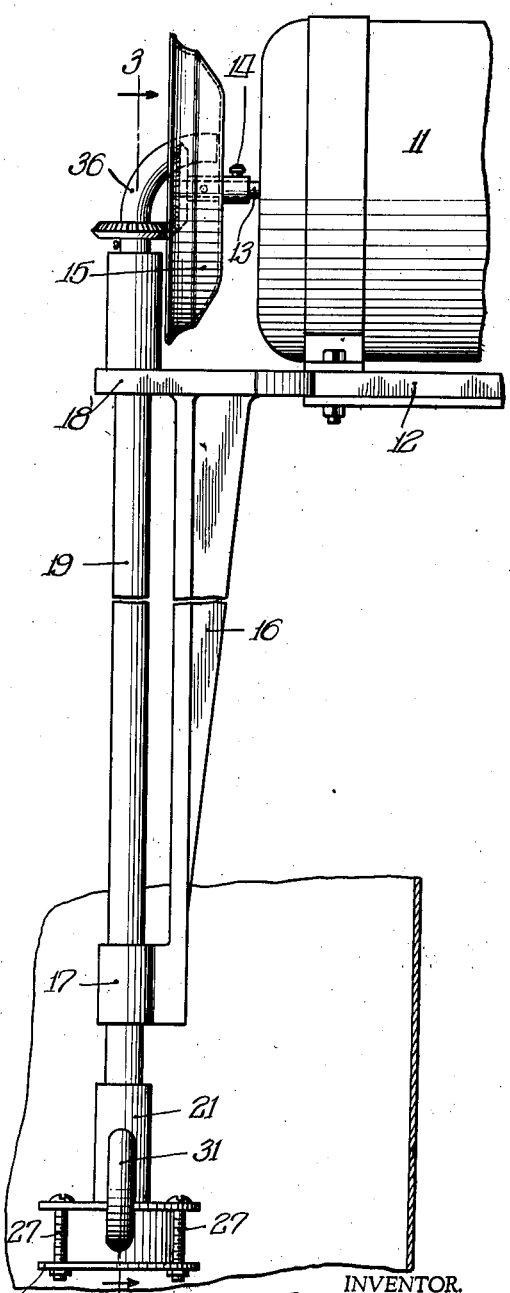
Figure 2 is an elevation of the sprayer at a right-angle to that of Figure 1.

Referring to these drawings for a complete comprehension of the novel and improved construction, it will be readily noted that an electric-motor 11 of any approved type, or other appropriate source of power, suitable to the conditions under which the sprayer or fog-disperser is to be operated, is mounted on a stationary member or base 12 in any convenient manner, as by bolting, so that it may be easily applied in position on the support or removed therefrom if occasion requires.

The protruding end portion of the horizontal, rotary shaft 13 of the motor has detachably mounted thereon, as by a set-screw 14, the hub of a saucer-shaped or somewhat-concave disc 15 with its concave surface facing away from the motor, as is clearly depicted.

The specified base 12 has integral therewith, or has mounted thereon, a depending member 16 having a lower cylindrically-apertured lug or ear 17 and an upper, aligned, like-apertured extension 18, such registered orifices snugly accommodating an upright tube or pipe 19, the lower portion of which carries and supports a casting 21 or its equivalent, the two parts being joined together in any suitable economical manner.

Such casting, or comparable member, is hollow, as presented in Figure 3, and it provides a bearing 22 for a vertical shaft 23 occupying the center portion of tube 19, leaving adequate space between itself and the inner surface of the member 19.

Below such bearing the casting provides a cylindrical chamber 24 housing a bladed liquid or water pump 25 carried on the lower end of the shaft 23, so that the rotation of the shaft revolves the pump-blades.

The lower wall of such pump-compartment 24 is formed by a plate 26 demountably fastened by screws 27 to the casting, such plate having a central port or opening 28 through which the water or other liquid in a vessel or tank 29, in which the pump is immersed, may flow into the chamber 24 to be acted upon centrifugally by the rapidly-revolving pump-blades.

As is clearly portrayed, an opening through the side-wall of the chamber 24 is connected by a pipe or tube portion 31 of the casting 21 to the interior of the upper hollow part of such casting which is in direct communication with the open lower end of the elongated, tubular, upright member 19.

Referring now to the upper part of the appliance, a bevel-gear 32 on the end of the motor-shaft 13 has its teeth in operative mesh with those of a companion bevel-gear 33 mounted fixedly on the top end of shaft 23, the latter occupying, and being revoluble in, a suitable bearing 34 in a hollow casting 35 through which the shaft extends and whose lower end is in direct connection with the upper end of the interior of the pipe or tube 19, the lower end of the casting 35 resting on the top of the projection or ledge 18, so that the latter supports the depending tubular member 19 and all of the elements associated therewith including the pump at the extreme lower end.

A conduit 36, constituting part of the member 35, is in communication with the interior of casting 35 and its other open or discharge end is close to the concave face of the rotary disc 15 inwardly away from its border or circular margin.

The apparatus operates substantially as follows:

The electric-motor 11 through its shaft 13 rapidly revolves the dished disc 15 mounted thereon and it also rotates the gear 32 which in turn revolves its associated gear 34, shaft 23 and the pump-blades 25, with the result that water from the tank or container 29 is, by the pump, forced upwardly through the connected tubular parts 31, 21, 19, 35, 36 and is discharged on to the face of the disc 15 whose rapid rotation throws or expels it out in the form of a substantially-uniform mist, fog, or spray of relatively large size against the surface of a filter-mat (not shown) through which air to be cooled, or conditioned, is being forced or sucked.

In this way, the moisture is applied to the air in a well balanced unvarying or equable manner to perform its temperature-reducing function in an efficient and effective action.

Those acquainted with this art will readily understand that the appliance as presented may be changed or modified in various respects without departure from the substance and essence of the invention as defined by the appended claims, and without the loss of any of its valuable benefits and advantages.

Those parts which have been shown and described as integral hollow castings, may for example, be composed of several parts suitably united together to perform their respective functions.

From what precedes, no difficulty will be experienced in understanding the manner in which the device accomplishes the aims and purposes of the invention stated hereinbefore.

I claim:

1. In an air-conditioner having a horizontal revoluble first shaft, a concave-disc mounted on and rotated with said shaft, a vertical second revoluble shaft, a liquid-pump including a casing and rotated blades therein mounted on and rotatable with said second shaft, gears operatively connecting said shafts together, means to rotate said first shaft and through said gears said second shaft and pump-blades, and conduit-means to convey the liquid pumped by said pump to and to deliver it on to the concave side of said disc, the novel features of said conduit-means including an upright tube supporting said pump-casing at its lower end, and of said second shaft extending through said tube longitudinally thereof.

2. The novel features set forth in claim 1 in which said tube is supported solely from its upper end portion.

CHARLES R. MORSE.